United States Patent [19]

Fowler

[11] 4,154,352
[45] May 15, 1979

[54] MOTORCYCLE TRAILER

[75] Inventor: Charles J. Fowler, Addison, Ill.

[73] Assignee: Highway Drydock, Inc., Petaluma, Calif.

[21] Appl. No.: 863,608

[22] Filed: Dec. 23, 1977

[51] Int. Cl.² ............................................. B60P 1/08
[52] U.S. Cl. .................................. 414/495; 280/43.17
[58] Field of Search ..................... 214/512; 280/43.17, 280/43.24

[56] References Cited

U.S. PATENT DOCUMENTS

| 2,041,616 | 5/1936 | Noell et al. | 280/43.17 |
| 3,400,944 | 9/1968 | Dion | 280/43.24 |

Primary Examiner—Robert G. Sheridan
Attorney, Agent, or Firm—Robert F. Van Epps

[57] ABSTRACT

An improved trailer particularly adapted for use in transporting motorcycles and having a retractable suspension arrangement whereby the load carrying bed may be raised for towing and lowered to ground level to facilitate loading and unloading. The suspension may be locked in the retracted position thereby rendering the trailer immobile and secure from theft and the suspension mounting may be vertically adjusted to vary ground clearance of the load bed without restricting operation of the retracting mechanism.

8 Claims, 5 Drawing Figures

MOTORCYCLE TRAILER

BACKGROUND OF THE INVENTION

1. Field of the Invention

The present invention relates generally to the field of wheeled land vehicles and more particularly to a new and improved trailer particularly adapted for use in transporting motorcycles and wherein the load carrying bed may be lowered to ground level to facilitate loading and unloading through use of a retractable suspension which may be locked in either a raised or lowered position.

2. Description of the Prior Act

Prior to the present invention various arrangements have been devised to permit the loading and unloading of vehicles on trailers. Specifically, ramp arrangements extending from ground level to the load bed and trailers having tilting load beds have been used. Both of these arrangements have proven inadequate in the loading and unloading of motorcycles. The problem arises in that a motorcycle may weigh in the range of 500 to 1000 pounds and has a high center of gravity. In riding a motorcycle up an inclined ramp or trailer bed at very low speed it is very difficult to maintain balance and the rider may be severly injured in a fall. The alternative is to push the motorcycle up the incline which is again dangerous in that the trailer structure interferes with the loading process and as the motorcycle is raised higher it becomes more difficult for the person or persons doing the loading to prevent tipping. A further problem with prior art motorcycle trailers has arisen due to their having a fixed ground clearance which if large enough to accomodate off-the-road terrain is too large for travel on the open road. Finally, motorcycle trailers, being generally of a light, open type of construction are susceptible to theft.

OBJECTS AND SUMMARY OF THE INVENTION

From the preceeding discussion it will be understood that among the various objectives of the present invention are included:

the provision of a new and improved motorcycle trailer;

the provision of a trailer of the above-described character wherein the load bed may be lowered to ground level for loading and unloading and raised for towing;

the provision of a trailer of the above-described character having adjustable ground clearance; and the provision of a trailer of the above-described character wherein the load bed may be locked in either a raised or lowered position.

These and other objectives of the present invention are efficiently met by providing a trailer suspension arrangement which is attached to the trailer structure and vertically adjustable with respect to said structure. The wheel mounting portion of the suspension is rotatable about an axis displaced from the axis of the wheel itself such that it may be raised and lowered with respect to the trailer load bed and locked in the raised or lowered positions.

The foregoing as well as other objects, features and advantages of the present invention will be more clearly understood from the following detailed description taken in conjunction with the appended drawings.

DESCRIPTION OF THE PREFERRED EMBODIMENT

Figure 1B:
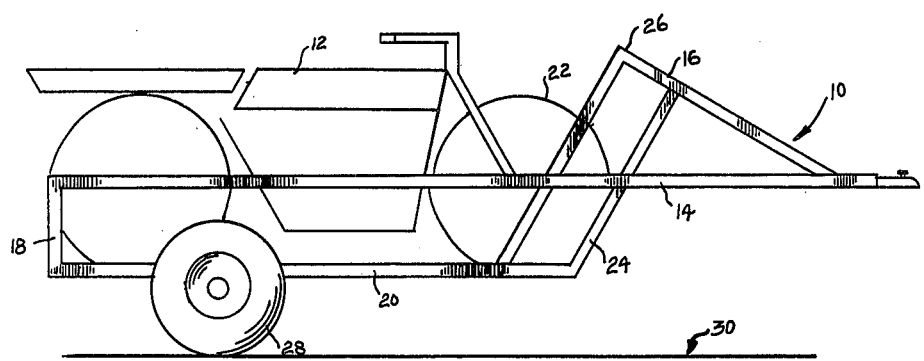
FIGS. 1A and 1B are schematic elevation views of the present invention in the raised and lowered positions, respectively.
Figure 1A:
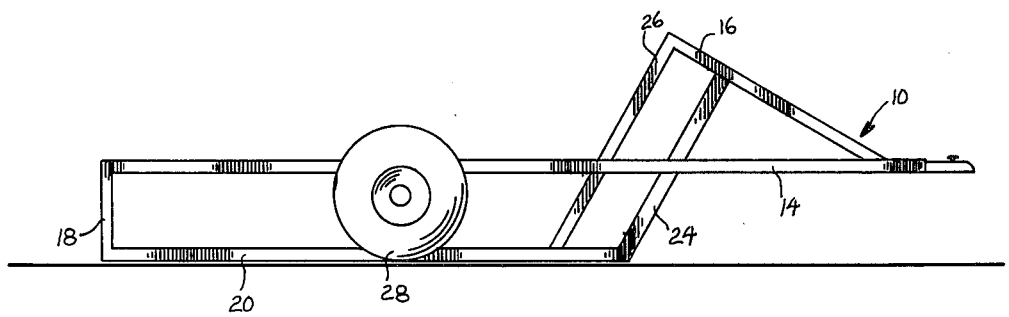

With reference now to FIGS. 1A and 1B there is illustrated a trailer 10 particularly adapted for transporting a motorcycle 12. The trailer structure may be of conventional construction having the usual structural members 14, 16 and 18 and is provided with a relatively lower load carrying bed 20 upon which to place the motorcycle 12 in an upright position with its front tire 22 against a stop 24 and between stabilizing supports 26, only one of which being shown. Any suitable tiedown means (not shown) may be used to secure the motorcycle 12 to the trailer structure and one of the stabilizing supports 26 may be provided with a lateral adjustment to thereby clamp the front tire in the proper position.

The basic principle of the invention is to provide an improved suspension whereby the trailer wheels 28 may be rotated in such a manner as to raise and lower the wheels 28 with respect to the load carrying bed 20. The bed 20 is lowered to ground level 30 such that the motorcycle may be easily driven on and off the trailer 10 as shown in FIG. 1B and raised for towing as shown in FIG. 1A.

Figure 2A:
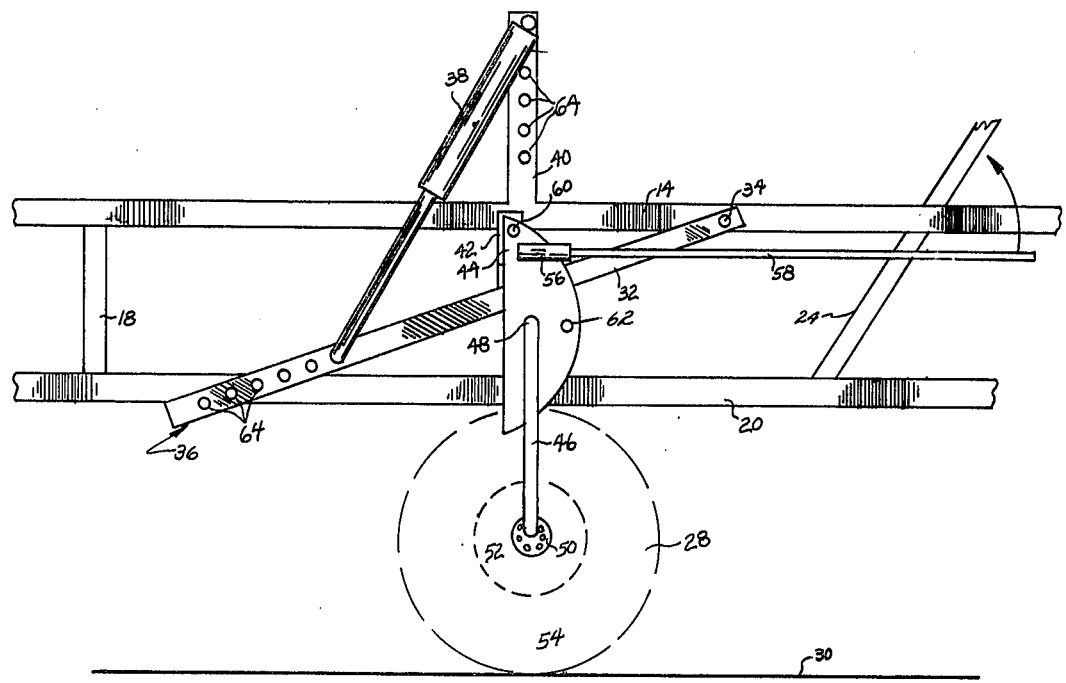
FIGS. 2A and 2B are detailed elevation views of the preferred embodiment of the suspension arrangement for use with the improved trailer of FIGS. 1A and 1B.
Figure 2B:
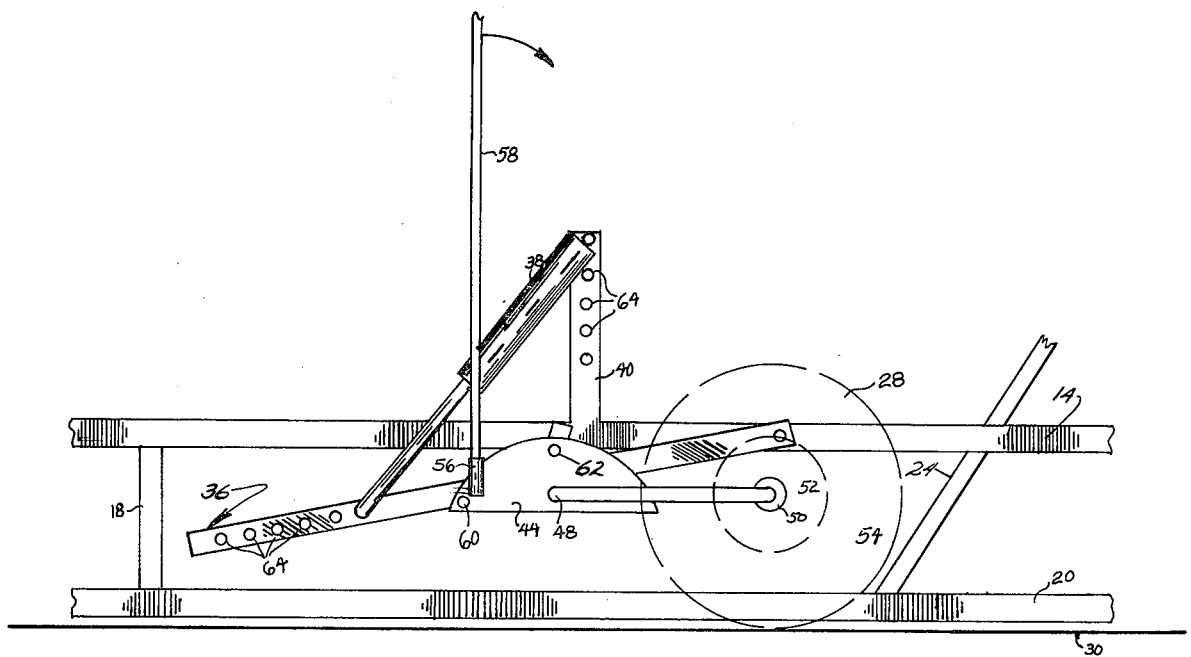

FIGS. 2A and 2B illustrate the preferred suspension arrangement whereby the operation illustrated in FIGS. 1A and 1B is effected and wherein elements common to those shown in FIGS. 1A and 1B are identified by like reference characters.

A trailing arm 32 is pivotally coupled at one end 34 to the trailer structure 14. The opposite end 36 of the trailing arm 32 is pivotally coupled to a shock absorber 38 of conventional and commercially available character. The trailer structure 14 is provided with a first upright member 40 to which the upper end of the shock absorber 38 is pivotally attached. A second upright supporting member 42 is rigidly affixed to and extends upwardly from the trailing arm 32. A semi-circular sector plate 44 is provided with a fixed Z-shaped strut 46, about the inwardly extending upper arm portion 48 of which the sector plate 44 is rotable with respect to the second upright supporting member 42. The outwardly extending lower arm portion of the strut 46 is provided with a hub 50 for mounting a wheel 52 and tire 54 assembly shown in phantom.

The second upright supporting member 42 and the sector plate 44 respectively are each provided with an aperture 60 which align with one another when the wheel 52 is in the lowered position. Any suitable locking arrangement such as a clevis pin may thus be inserted through the second upright supporting member 42 and 44 to secure the suspension in the lowered position for towing. The sector plate 44 is also provided with a second aperture 62 disposed such that it is rotated into alignment with the aperture 60 in the second upright supporting member 42 when the wheel 52 is in the raised position and the load bed 20 is resting on the ground. With this arrangement the locking device may be re-inserted to secure the trailer in an immobile position to thereby prevent theft. The second sector plate 44 is also provided with a socket 56 into which a lever arm 58 may be inserted, which arm is used to raise and lower the suspension. If the trailer structure 14 is formed of box or tubular members the lever arm may be easily stored for travel in such member or members.

From the lowered or towing position of FIG. 2A, to raise the wheel 52, the lever arm 58 is inserted in the socket 56 and the locking device removed from the appertures 60. The wheel 52 will then rotate together with the sector plate 44 about the upper arm portion 48 of the strut 46 under the weight of the trailer. The lever arm 58 is used to manually control the speed of the relative movement of the wheel 52 and load bed 20. For purposes of economy and ease of construction the suspension on each side of the trailer may be independently actuated and, providing the load is adequately secured against lateral movement, the relatively shallow angle at which the trailer will tilt is acceptable since the side loading on the suspension and wheel bearings (not shown) is taken up by the second upright supporting member 42 and sector plate 44. Alternatively, both wheels could be raised and lowered simultaneously by two persons working together as described or by a single individual using a dual winch and cables (not shown) attached to each sector plate 44. Once both wheels 52 are raised the load bed 20 rests at ground level 30 and the locking device is reinserted through the second aperture 62 in the sector plate 44 and the first aperture 60 in the second upright supporting member 42 thus securing the trailer against theft. The motorcycle may be merely driven or pushed on and off the load bed 20 with ease. To lower the wheel to the towing position the above-described operation is simply reversed.

Either or both the first upright member 40 and the lower end 36 of trailing arm 32 may be provided with a spaced plurality of mounting means 64 for shock absorber 38. Thus by adjustment of the shock absorber mounting position the ground clearance of the load bed 20 may easily be adjusted to facilitate towing the trailer over varying types of terrain.

Figure 3:
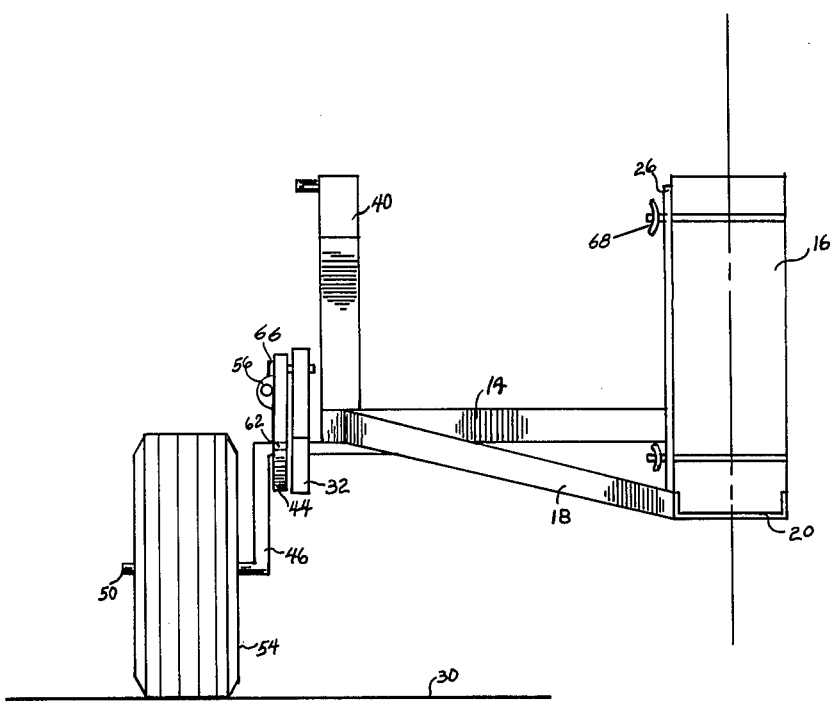
FIG. 3 is a partial end elevation view of the suspension arrangement of FIGS. 2A and 2B.

FIG. 3 is a partial end elevation view of the suspension arrangement of FIGS. 2A and 2B which more clearly illustrates the spatial relationships of the first upright supporting member 42 and sector plate 44, locking apertures 60 and 62, and a locking device 66. Also shown is the relatively lower plane of the load bed 20 with respect to the remainder of the trailer structure 14 and a screw adjustment 68 whereby the stabilizing supports 26 may be tightened against the front tire of the motorcycle. By placing the load bed 20 at a relatively lower plane it is possible to use a strut 46 which is shorter than the radius of the tire 54 thereby improving the structural integrity of the suspension and increasing the mechanical advantage of the lever arm described above.

From the foregoing discussion it will be understood that the applicant has provided a new and novel trailer whereby the objectives set forth hereinabove are efficiently achieved. Since certain changes in the above-described construction will occur to those skilled in the art without departure from the scope of the invention it is intended that all matter set forth in the preceding description or shown in the appended drawings shall be interpreted as illustrative and not in a limiting sense.

Having described what is new and novel and desired to secure by Letters Patent, what is claimed is:

1. A trailer comprising
   a frame, disposed in a first longitudinal plane;
   a load bed attached to said frame;
   first and second trailing arms, one pivotally coupled at one end to opposite sides of said frame;
   a first upright supporting member affixed to and extending upwardly from each side of said frame;
   a shock absorber pivotally coupled between the opposite end of each said trailer arm and each said upright supporting member;
   a second upright supporting member rigidly affixed to and extending upwardly of each said trailing arm intermediately of the coupling of said trailing arm to said frame and the coupling between said shock absorber and said trailing arm;
   a semi-circular sector plate disposed adjacent to and in a substantially vertically parallel relationship with said upright supporting member;
   a Z-shaped strut rigidly affixed along a major portion of the length thereof to the surface of each said sector plate opposite said second upright supporting member, each said strut having an upper arm portion extending inwardly through said sector plate and being rotatably mounted through said second upright supporting member, and having an outwardly extending lower arm portion;
   a wheel hub affixed to the outer end of the lower arm portion of each said strut;
   a ground engaging wheel affixed to each said hub; and
   means for rotating each said sector plate with respect to the said second upright supporting member about the upper arm portion of said strut whereby said wheels are raised and and lowered with respect to the plane of said load bed thereby raising said load bed to an upper position for movement of said trailer and lowering said load bed to ground level for loading and unloading.

2. A trailer as defined in claim 1 wherein, said load bed is disposed in a second longitudinal plane relatively lower than said first longitudinal plane.

3. A trailer as defined in claim 1 and further including a plurality of shock absorber mounting means disposed along the length of each said first upright supporting member whereby the coupling of said shock absorbers is vertically adjustable to thereby vary the distance between said load bed and the ground when said wheels are in the lowered position.

4. A trailer as defined in claim 1 and further including a plurality of shock absorber mounting means disposed along the length of each said trailing arm whereby the coupling of said shock absorbers is vertically adjustable to thereby vary the distance between said bed and the ground when said wheels are in the lowered position.

5. A trailer as defined in claim 1 wherein, said Z-shaped strut is of a length which is relatively less than the radius of said ground engaging wheel.

6. A trailer as defined in claim 1 wherein, said rotating means comprises a socket rigidly affixed to the surface of each said sector plate opposite said second upright supporting member and a lever arm adapted for insertion into said socket.

7. A trailer as defined in claim 1 and further including stabilizing means fixed to said load bed and adapted to receive and engage the front tire and wheel of a motorcycle in an upright position.

8. A trailer as defined in claim 7 wherein, said stabilizing means is transversely adjustable such as to grip the front tire of a motorcycle in an upright position.

* * * * *